Nov. 13, 1934.　　　　H. DAVIS　　　　1,980,168

WORK GUIDE

Filed May 10, 1933

Inventor:
HERBERT DAVIS,
by: Usina & Rauber
his Attorneys.

Patented Nov. 13, 1934

1,980,168

UNITED STATES PATENT OFFICE 1,980,168

WORK GUIDE

Herbert Davis, Ellwood City, Pa., assignor to National Tube Company, a corporation of New Jersey Application May 10, 1933, Serial No. 670,343

3 Claims. (Cl. 80—51)

This invention relates to seamless tube mill work-guides such as are used to hold the work in a mill's working pass. This pass is formed by a set of rolls which advance the work while rotating it at a rather high speed. As the guides frictionally contact the work they are subject to wear which roughens their surfaces. Their upkeep is rather high, particularly since they are generally mounted so that their replacement is somewhat difficult and requires that the mill be stopped for a longer period of time than is desirable. Therefore, one of the objects of the present inventor is to lessen the expense caused by these guides and to enable the provision of new guiding surfaces without greatly interrupting operations. Other objects may be inferred.

Having reference to the accompanying drawing which illustrate one example of the invention:

Figure 1:
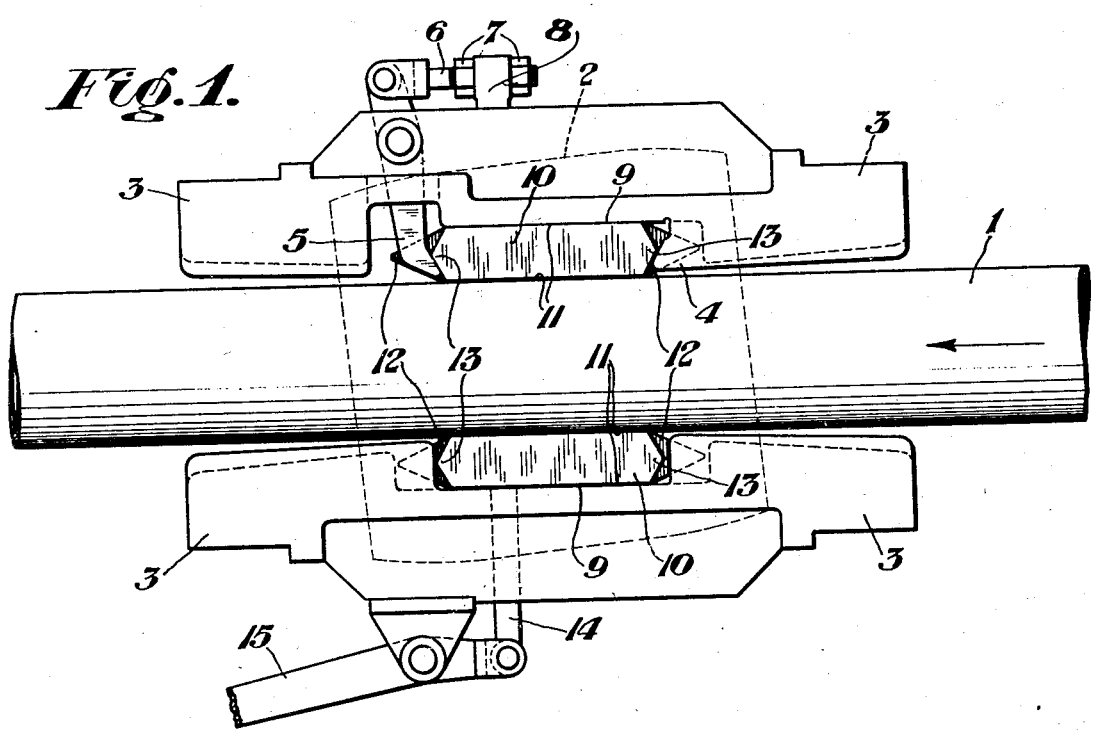
Figure 1 shows the work held in the working pass of a mill, only those parts being shown which are required to illustrate the invention.

The work 1 is passing through the mill in the direction indicated by the arrow. One of the rolls 2 is shown by broken lines to locate the mill's working pass. Mountings 3 are spaced above and below this working pass. The upper one has opposed clamping members 4 and 5, one member swinging away from the other by being pivotally fixed to its carrying mounting. The swing is controlled by a bolt 6 pivotally fixed to this swinging member's upper end and moved by operation of nuts 7 screwed onto it at either side of a stationary holding member 8. This swinging guide acts as a lever.

Figure 2:
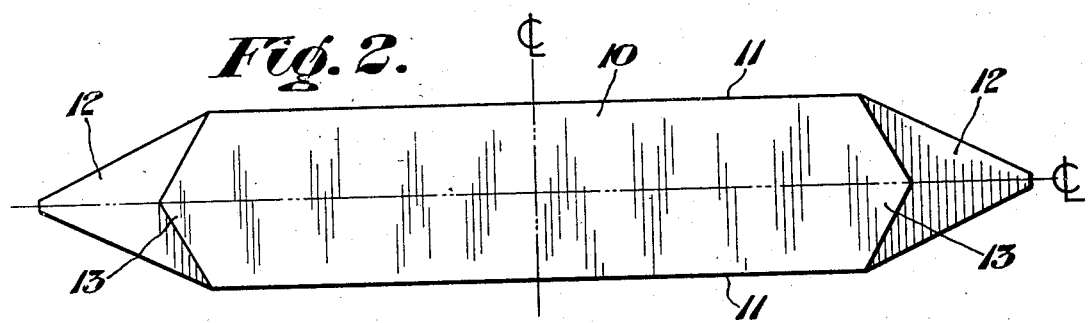
Figures 2 and 3 are side and top views of one of the guides shown in Figure 1.
Figure 3:
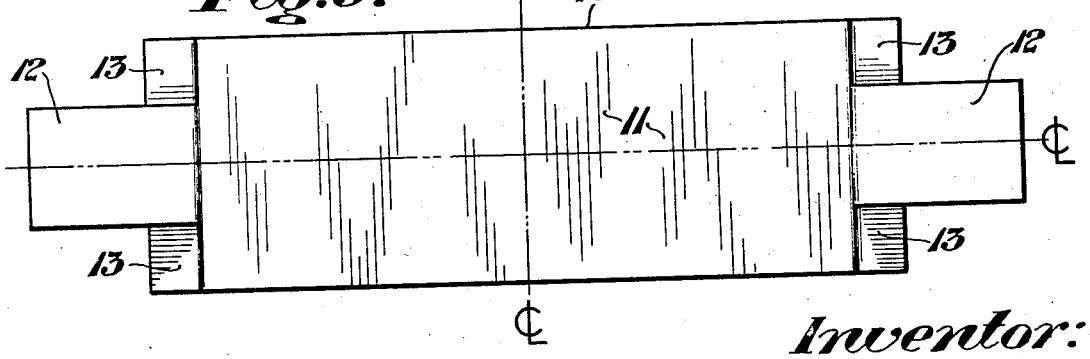

Both the guides provide flat seats 9 which position the guides 10. These guides are symmetrically constructed and are particularly characterized in that the sides of each provide guiding surfaces 11 symmetrically arranged about the guide's transverse and longitudinal center lines, as is clearly shown by Figures 2 and 3. In addition, their ends provide plural projections 12, in each instance one of these projections 12 being symmetrically diminished in size from the guiding surfaces 11 and another one, 13, being shaped for engagement by the opposed clamping members 4 and 5 of the upper mounting.

These guides are positioned with their surfaces 11 against the seats of the upper and lower mountings 3, the lower guide being gravitationally held in place and the upper one being clamped between the members 4 and 5 of the upper mounting, by means of its projections 13 provided for this purpose. The guide's free surfaces 11 function to hold the work in the mill's pass.

When the guiding surfaces positioned by the above arrangement become worn or damaged, the guides are simply reversed in the mountings 3 and a new set of guiding surfaces thus brought into use. The upper and lower guides may be interchanged, the guides may be changed end-to-end, or the guides may be completely reversed to bring smooth surfaces into play. In case it is desirable to provide longitudinally concave guiding surfaces which fit the work, the mountings 3 should accordingly have longitudinally convex seats. Other changes and modifications may be made to accommodate different classes of work so long as the fundamental idea of the particularly arranged guiding surfaces be preserved. The new guides may be used with other types of tube or pipe mills.

The advantages of the invention are fairly obvious. However, it might be well to particularly point out that these guides must be handled in a terrific hurry by the mill operators. The preservation of the work's heat demands this. Consequently, there is a danger of improperly installing guides which have a top, bottom, front and back. With the new guides, improper installation is practically impossible. Even if one of the guides be given two complete reversals, so that the original worn surface is again brought into play, no danger to the mill will result.

The lower mounting may be provided with a vertical push-rod 14 operated through a lever 15, either manually or by power. This will lift the lower guide from its seat so that it may be more quickly handled, particularly if it has become stuck by falling scale. The two mountings 3 may, of course, be adjusted respecting the pass of the mill, by any of the usual agencies.

I claim:

1. A tube mill work-guide having its sides providing two or more guiding surfaces symmetrically arranged about its transverse and longitudinal center lines and having projections at each of its ends in each instance one of said projections being symmetrically diminished in size from each of said surfaces to guide the work thereonto and another of said projections being shaped for mounting purposes.

2. A tube mill including opposed mountings equally spaced above and below the mill's working pass, the upper one of said mountings having opposed clamping members, and work-guides positioned by said mountings, said guides each having its sides providing two or more guiding surfaces symmetrically arranged about its transverse and longitudinal center lines and having its ends providing plural projections, in each instance one of said projections being symmetrically diminished in size from said surfaces to guide the work thereonto and another being shaped for engagement by said opposed clamping members of the upper mounting.

3. A tube mill including opposed mountings equally spaced above and below the mill's working pass, the upper one of said mountings having opposed clamping members, and work-guides positioned by said mountings, said guides each having its sides providing two or more guiding surfaces symmetrically arranged about its transverse and longitudinal center lines and having its ends providing plural projections, in each instance one of said projections being symmetrically diminished in size from said surfaces to guide the work thereonto and another being shaped for engagement by said opposed clamping members of the upper mounting, said lower mounting being provided with a means for lifting the guide positioned thereby, whereby the latter may be removed or reversed.

HERBERT DAVIS.